2 Sheets--Sheet 1.

P. C. PERKINS.

Improvement in Wind-Mills.

No. 5,122. Reissued Oct. 29, 1872.

Witnesses

Walter Allen
W. H. Pearce

Inventor.

P. C. Perkins
By Knight Bros
Attorneys

AM. PHOTO-LITHOGRAPHIC CO. N.Y. (OSBORNE'S PROCESS.)

P. C. PERKINS.
Improvement in Wind-Mills.
No. 5,122. Reissued Oct. 29, 1872.
FIG. 3.
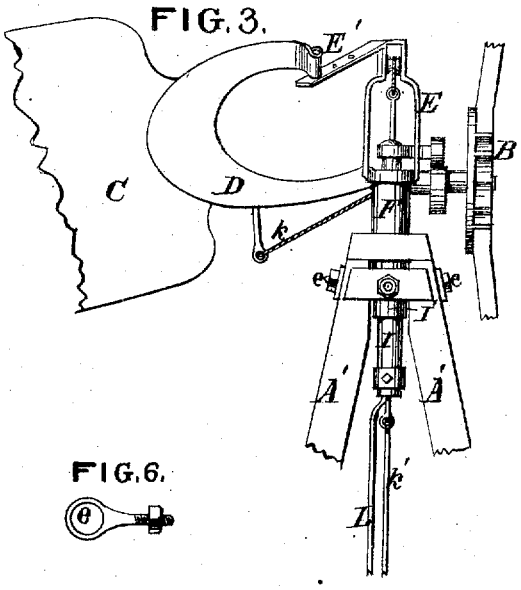
FIG. 4.
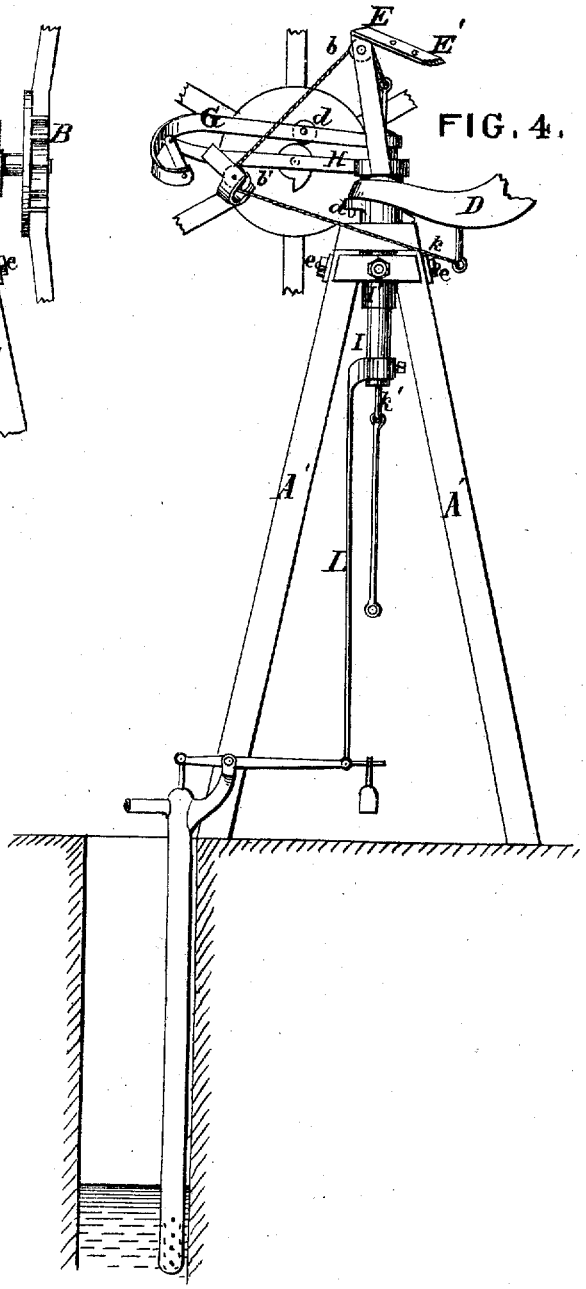
FIG. 6.
FIG. 5.
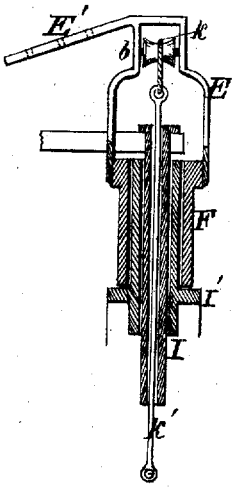
Witnesses
Walter Allen
W. H. Pearce
Inventor.
P. C. Perkins
By Knight Bros,
Attorneys
AM. PHOTO-LITHOGRAPHIC CO. N.Y. (OSBORNE'S PROCESS.)

UNITED STATES PATENT OFFICE.

PALMER C. PERKINS, OF MISHAWAKA, INDIANA.

IMPROVEMENT IN WINDMILLS.

Specification forming part of Letters Patent No. 93,472, dated August 10, 1869; reissue No. 5,122, dated October 29, 1872.

*To all whom it may concern:*

Be it known that I, PALMER C. PERKINS, of Mishawaka, in the county of St. Joseph and State of Indiana, have invented an Improvement in Windmills, of which the following is a specification:

*Nature and Objects of the Invention.*

This invention consists, first, in so constructing a windmill that the wind-wheel may be turned on its vertical axis independently of or relatively to the vane or rudder, causing at the same time a slight elevation or vertical deflection of the latter, so that the weight of the vane will tend to restore the wheel to its normal or operative position; second, in mounting the wind-wheel or wind-receiving surface on a frame or arm projecting laterally on one side of the vertical axis on which the mill turns; third, in the mode of mounting the vane or rudder; fourth, in mechanism for transmitting the power of the wind-wheel; fifth, in combining with a tubular rod or shaft, by which motion is transmitted from the wind-wheel, a rod, chain, or cord, passing through the said tubular rod or shaft, and employed to control the speed or power of the mill; sixth, in the combination and arrangement of devices employed for controlling the position of the wind-wheel relatively to the vane or rudder; seventh, in devices for bracing and adjusting a vertical arbor, on which the mill turns.

*Description of the Drawing.*

Fig. 3 is a perspective view of the same taken from the opposite side of the rudder, showing the tube through which the rods pass for the purpose of operating pumps or other devices. Fig. 4 is a side elevation, showing the cam which operates a pump and the way in which such pump may be operated. Fig. 5 is a vertical section on line *x x* of Fig. 3. Fig. 6 is a plan view of one of the eyebolts which holds the vertical arbor in position on the frame of the machine.

Corresponding letters represent corresponding parts in the several figures.

*General Description.*

Figure 1:
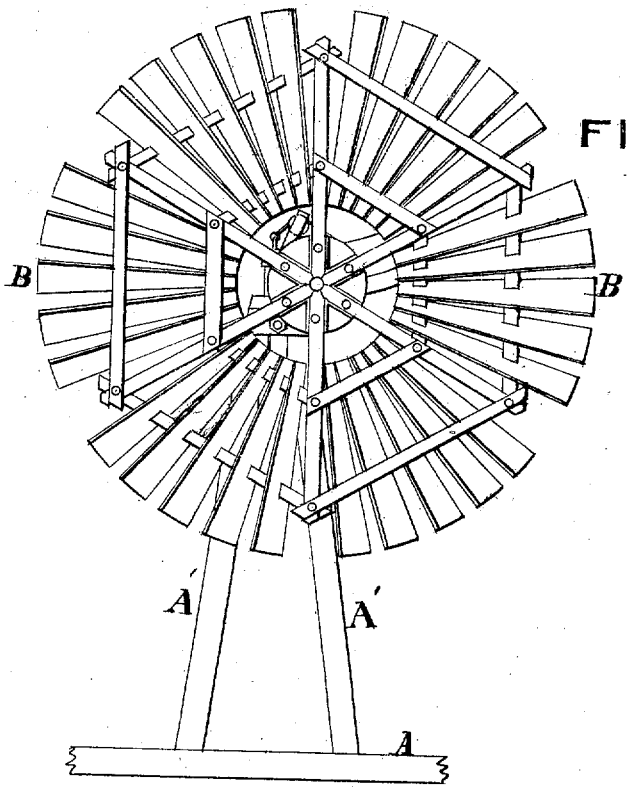
Figure 1 represents a front elevation of my improved mill.
Figure 2:
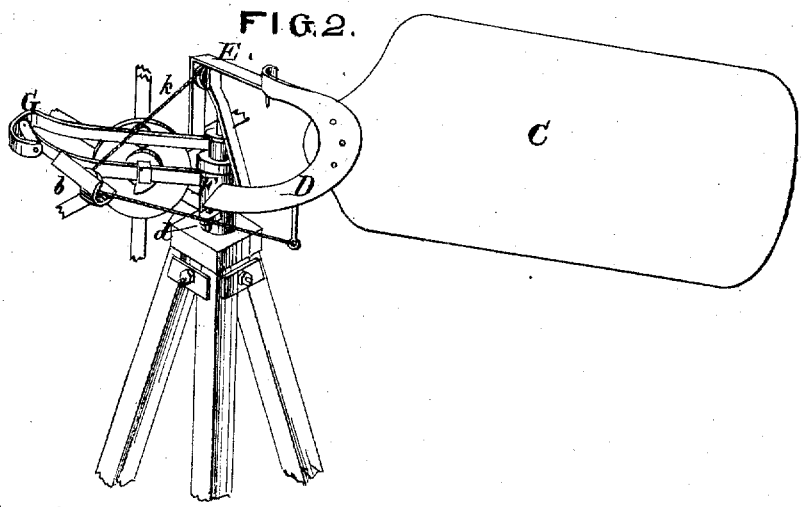
Fig. 2 is a perspective view of the same, showing the rudder or vane, the frame to which it is attached, the rope or chain for controlling the relative positions of the wheel and rudder, and various other parts.

A in the drawing represents the base of the machine, which may consist of a frame made of wood, or it may be of masonry and have the vertical or nearly vertical parts which support the machinery secured therein. A′ A′ represent the posts, which are secured within the base or foundation, of which there may be one or more, they being of any desired length to give the proper elevation to the wind-wheel, and of such dimensions otherwise as to have the requisite strength to support all the parts of the device. B represents the wind-wheel, which may be constructed as shown in Fig. 1 of the drawing or in any other suitable manner. The arms of the wheel are attached in the center to a hub or shaft of any suitable construction, by means of which the wheel is supported and its power transmitted. In the present illustration the shaft is made short and hollow, running on a stationary arbor, and carrying upon its inner end a cam, which may be cast thereon or be cast separately, and screwed or bolted thereto in any suitable manner, so that as the wind-wheel is rotated said cam shall come in contact with the under side of a lever and raise the same gradually, and yet permit it to fall with a more rapid motion, the side of the cam which is opposite to that which raises the lever being constructed substantially as shown in Fig. 4 of the drawing for that purpose.

In the event of its becoming desirable to work the pump more slowly than would be the case with the above arrangement, it would only be necessary to attach to the hub of the wind-wheel, or to a shaft passing through the same, a pinion, and so arrange it that it should mesh into a large wheel to be placed upon a separate shaft, which shaft would have its bearings in the same frame or upon the same arm to which the wind-wheel is secured, and place the cam upon the hub of such large wheel or upon the shaft which it rotates, which arrangement would reduce the number of strokes of the pump to any desired extent, dependent only upon the size of the wheels used.

C represents the rudder or vane, which may be of wood or of sheet metal, and of any required size, its office being to keep the wind-wheel in proper position to receive the wind upon the front of its sails or arms. D represents a frame or yoke forming one method of securing the rudder to the mill, or to the posts upon which it turns. This metallic connection may, however, be dispensed with and strips of wood be used, which strips may have, upon their inner ends, hinges of any suitable kind attached thereto for securing it to the mill; or it may be attached by means of a spring or springs which will yield or bend to the extent necessary to allow the wheel and rudder to approach each other. To the outer or curved portion of this frame D, when one is used, the rudder is to be secured by being riveted or bolted thereto, while the lower arm of its inner bifurcated end rests upon a projection, *d*, formed upon the socket F, to which it is secured by means of a pin, which passes through its extreme outer end and through the projection alluded to, so that said frame may turn freely upon such pin and projection. The upper arm of the frame D is hinged to a support, E′, projecting from a standard, E, on the socket F. The object of the above-described arrangement of parts is to enable the rudder and the wind-wheel to be brought around to a position parallel, or nearly so, with each other when it is not desirable to have the mill operate, and to enable them to recede and return to their original position when the mill is to be put in operation. The arm E′, which holds the upper portion of frame D, may be perforated with a series of holes so as to give the outer end of the rudder more or less elevation by inserting the pivot in one nearer to or further from the socket F. F represents a sleeve or socket, the lower end of which rests upon the upper end of the upright portion of the frame or upon a plate of metal placed thereon, it being so arranged as to turn freely upon the pipe I′, which passes down through the center of it. H represents an arm or frame secured to the socket F and projecting laterally therefrom. To this arm or frame, at a point outside of the center of the socket F, the axle or shaft upon which the wind-wheel revolves is to be mounted, so that as more wind comes in contact with such wheel than is required to furnish the requisite amount of power it has the effect to turn the socket around and thus bring the face of said wheel nearer and nearer parallel with the vane or rudder and thus reduce the effective force of the wheel for the time being. It will be seen, by referring to the drawing, that when the parts are in position to receive the greatest effect from the wind the face of the wind-wheel is set at a right angle to the sides of the rudder or vane, or nearly so, and that as the wheel is turned from such position the effect of the wind upon the wheel is regularly diminished, or, in other words, a less amount of force is exerted upon such wheel, and this ratio of diminution is continued until the face of the wheel and the sides of the vane are brought nearly or quite parallel with each other, at which time the effect of the wind upon the wheel, so far as the production of rotary motion thereof is concerned, will have nearly ceased. This feature of the invention is regarded as of great importance, as it makes the mill self-regulating, and thus prevents the possibility of its being injured by the too rapid motion of its parts. It is apparent, however, that the same result may be produced by other and equivalent means. I represents a pipe or tube, having a collar upon its upper end, which rests upon the lever G, from which point it extends downward through the socket F and tube I′ for a distance sufficient to permit of fastening thereto the pump-rod L. I′ represents a pipe, which has upon it a collar at such a point as to rest upon the top of the frame and receive upon its upper surface the lower end of socket F, which collar may take the place of the plate above alluded to, if desired. The portion of this pipe which is above said collar extends up a distance about equal to the length of the socket F and forms the axis upon which such socket turns, while that portion of said pipe which is below said collar extends downward for some distance, and is braced and adjusted by eyebolts *e* or their equivalent, which secure it to the frame-work. It will be seen that the socket fits the outer surface of the upper end of this pipe, while the tube I moves upon its inner surface. There may be any required number of eyebolts *e*, their apertures being of the required diameter to receive the pipe I′. In placing the parts of the machine in position the pipe is to be passed through these eyebolts, which will leave their threaded portion standing out at right angles to such pipe. On the ends of these bolts any suitable caps or washers may be passed, which shall rest upon the posts or post upon which the mill is supported, and then the nut screwed down upon the same, so that the pipes may be held firmly in their position, and may, by loosening the nuts upon these bolts, be lowered or raised and again secured in their altered position, or may be moved sidewise or brought into a vertical position when it has from any cause departed from its position. K represents a rope or chain, attached to the vane or rudder C or its attaching frame D, from which point it passes around a pulley or roller, *b*′, attached to the arm or frame H, and from thence to and over the pulley or roller *b*, in the frame E, where it may be united to a rod, K′, which passes down through the tube I, so that it may be operated upon by the devices shown in Fig. 4, or any other suited for the purpose, as a further means of controlling the speed of the wind-wheel, by causing the surfaces of such wheel and the rudder to approach toward and permitting them to recede from each other. The pivots on which the vane or rudder turns laterally are not set directly one above the other. The vane therefore turns on an inclined axis, causing it to rise when deflected relatively to the wind-wheel. The gravity of the vane is thus made available, in restoring the wheel and vane to their normal relative positions for operation, when the vane is released or when the excessive force of the wind ceases. L represents a rod, which is to be secured to the lower end of the tube I, and so arranged that its lower end may be connected to the lever of a pump, as shown in Fig. 4, or to any other devices to which it is desirable to give a reciprocating motion. G represents a lever, the inner end of which embraces or is attached to the upper end of the pipe I, from which it extends outward for any suitable distance to enable its outer end to be fulcrumed to the arm or frame H so that its inner end may move up and down with the pipe. To this lever, at a point above the cam C, upon the hub of the wind-wheel, or upon the shaft of the same, a stud projects, which stud has a roller fitted upon it so as to revolve freely thereon, so that said cam comes in contact with the roller. The lever is raised and kept in its elevated position until the full part or highest point of the cam has passed said roller, and then drops down by its own gravity or by any other force which may be applied to it.

I have shown and thus far described my improved mill as applicable only to machines or devices requiring a reciprocating motion, but it is equally applicable to those requiring a rotary motion, the only change required in such cases being to insert a hollow shaft in the place now occupied by the tube I, whose outer diameter shall be such as to cause it to turn freely within pipe I′. To the upper end of such shaft a pinion may be attached, which will receive its motion from a gear-wheel placed upon the hub of the wind-wheel or upon the shaft upon which it is mounted, and be so arranged as to mesh into the pinion upon the hollow shaft or into an intermediate wheel, which wheel shall mesh into said pinion. To the lower end of the hollow shaft a gear or pulley may be secured, which shall give motion to any machine which it may be desirable to attach it to.

*Claims.*

The following is claimed as new:

1. A windmill so constructed and arranged that the wind-wheel when turned upon its vertical axis, and its face brought to a plane parallel or approximately parallel with the vane or rudder, will, when released, return to its normal position by the gravity of the vane, substantially as and for the purpose set forth.

2. A wind-wheel mounted upon an arm or frame at one side of the center of its vertical axis, substantially as and for the purpose set forth.

3. The combination of a wind-wheel and a vane or rudder mounted on separate vertical or nearly vertical axes, one or both of which are not in the same vertical plane as the horizontal axis of the wheel.

4. A vane or rudder mounted on an inclined axis, so that it may be deflected laterally and restored to its normal position by gravity.

5. The combination and arrangement of the socket F, frame or arm H, and lever G, the latter receiving a reciprocating movement by any suitable mechanical connection with the hub or shaft of the wheel.

6. The combination of a hollow rod or shaft, I, for transmitting motion from the wind-wheel, and a rod, cord, or chain, K′, passing through the said hollow rod or shaft to control the speed or power of the mill.

7. The combination and arrangement of the rudder C, rod K′, and connecting rope or chain K, the latter passing over one or more pulleys, substantially as and for the purposes specified.

8. The combination of the bolts *e*, pipe I′, and frame A, substantially as and for the purpose specified.

PALMER C. PERKINS.

Witnesses:

OCTAVIUS KNIGHT,
WALTER ALLEN.